United States Patent [19]

Jones et al.

[11] 3,996,330
[45] Dec. 7, 1976

[54] METHOD OF MAKING A MOLDED BRUSH BACK

[75] Inventors: Kenneth B. Jones; Walter C. Gorenflo, both of Easthampton, Mass.

[73] Assignee: Vistron Corporation, Cleveland, Ohio

[22] Filed: Oct. 23, 1975

[21] Appl. No.: 625,205

Related U.S. Application Data

[62] Division of Ser. No. 507,768, Sept. 20, 1974, Pat. No. 3,936,261.

[52] U.S. Cl. ............................. 264/328; 264/243; 425/245 R; 425/805
[51] Int. Cl.² ...................... B29C 5/00; B29F 1/05
[58] Field of Search ........................ 264/328, 243; 425/245 R, 244, 805, DIG. 51, 249; 74/568 R, 567

[56] References Cited
UNITED STATES PATENTS

| | | | |
|---|---|---|---|
| 2,651,810 | 9/1953 | Snyder | 425/801 |
| 2,770,011 | 11/1956 | Kelley | 425/DIG. 51 |
| 3,371,384 | 3/1968 | Nouel | 264/328 |
| 3,590,114 | 6/1971 | Uhlig | 425/245 |
| 3,847,525 | 11/1974 | Bielfeldt et al. | 425/244 |

*Primary Examiner*—Willard E. Hoag
*Attorney, Agent, or Firm*—John F. Jones; Sherman J. Kemmer

[57] ABSTRACT

A finished plastic-handled brush is prepared by a single molding step involving gateless molding of the brush back by a tunnel-gating and novel punch-pin finishing apparatus and process which eliminates the usual gate stud, and removing the finished brush back and securing tufts of bristles in the face of the brush back to complete the brush construction.

3 Claims, 11 Drawing Figures

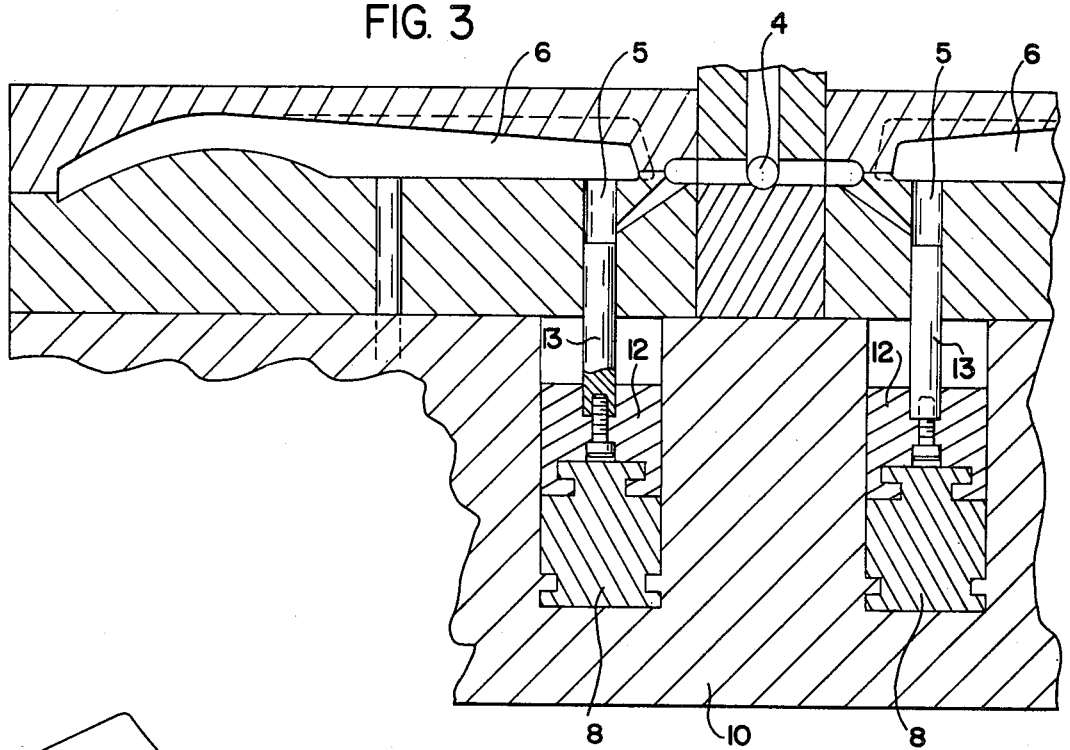
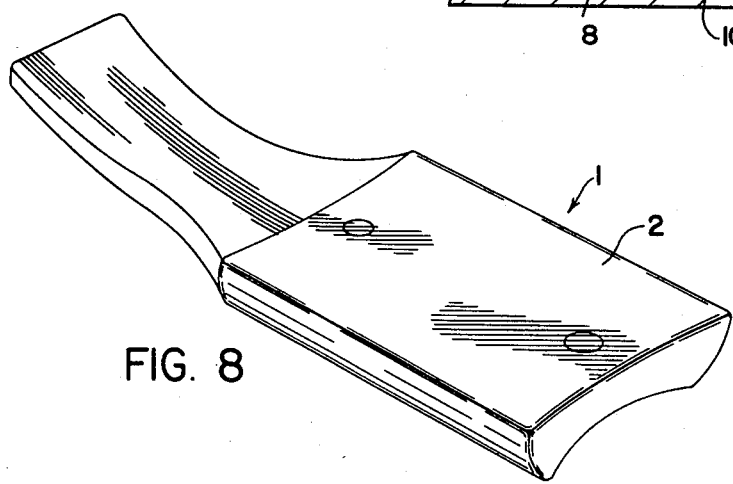
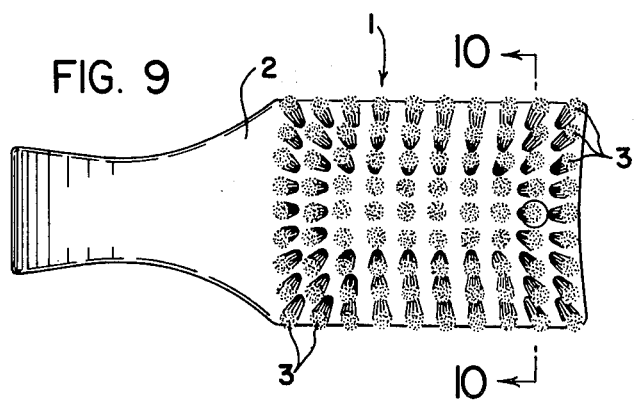
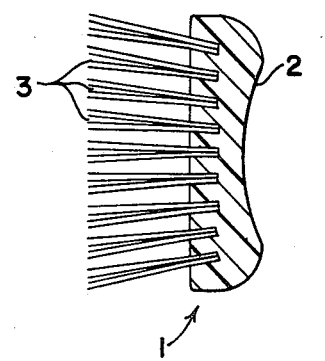

METHOD OF MAKING A MOLDED BRUSH BACK

This is a division of application Ser. No. 507,768 filed Sept. 20, 1974, now U.S. Pat. No. 3,936,261.

This invention relates to a method for manufacturing completely finished plastic brush backs by a single mold step involving gateless molding by tunnel-gating and punch-pin finishing which eliminates the usual gate stud, and to the stapled brushes produced by this novel method. The brushes embodied in this invention includes hairbrushes, toothbrushes, clothes brushes, industrial brushes, brooms, and the like.

Brushes of many types and descriptions having plastic bodies or backs are well known and, in the past, have been produced from thermoplastic material by extruding the plastified thermoplastic material into a suitable mold, removing the brush back, removing the flashing and excess plastic material, polishing the rough edges left, and then drilling and stapling the brush back with tufts of bristles. In order to anchor or lock a tuft of bristles in each of the cavities drilled in the brush back, a metallic insert or pin may be forced into the cavity simultaneously with the tuft, as is well known in the art. In the present invention, the brush backs produced are in finished condition ready to be stapled with no flashing and excess plastic material to be removed, polishing, etc., required.

The present invention is further illustrated in the accompanying drawings wherein:

FIG. 3 is a side cross-sectional view of the mold taken along line 3—3 in FIG. 2.

FIG. 8 is a perspective view of the bottom of the finished brush back made according to this invention.

FIG. 9 is a bottom perspective view of the stapled brush according to this invention.

FIG. 10 is a front cross-sectional view of a brush of this invention taken along line 10—10 in FIG. 9.

Figure 1:
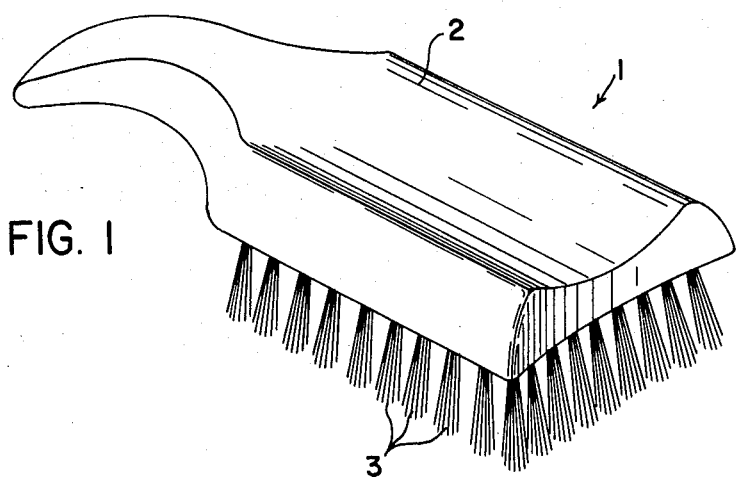
FIG. 1 is a perspective view of a brush of this invention.
Figure 2:
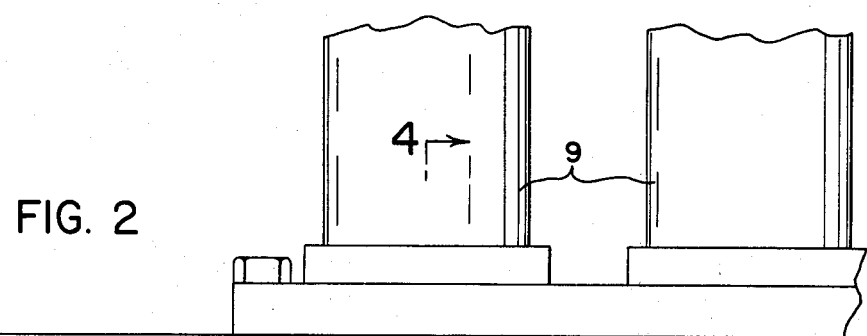
FIG. 2 is a top fragmented view of a double mold with brush-back cavities used in the production of the brush of FIG. 1.
Figure 11:
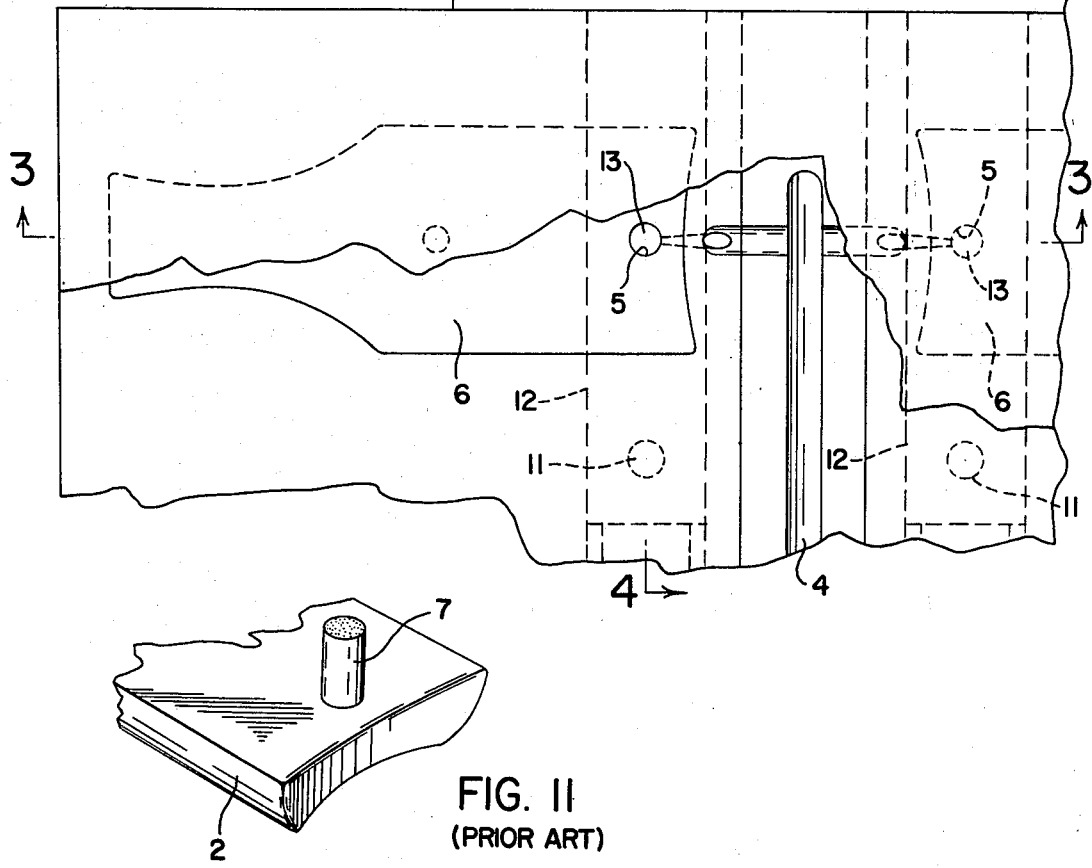
FIG. 11 is a bottom perspective view in fragment of a brush back made according to the prior art after it was removed from the mold.

The brush 1 is composed of a plastic back 2 with tufts of bristles 3 secured in the bottom face thereof by drilling and stapling means well known to those skilled in the art. The brush back 2 is prepared preferably by extruding flowable thermoplastic material into a runner section 4 of the mold and through the gate section 5 of the mold into the brush back cavity 6. In the drawings, a cylindrical gate 5 is shown on the face of the brush which produces a cylindrical plug 7 on the face of the brush back when it is prepared by the prior art method and removed from the mold. According to the prior art, it is necessary to rout off the cylindrical plug 7 before the brush is ready to be stapled. This routing or plug-removal step is avoided by the present invention. According to the present invention, there is provided an attachment to the mold a cam slide 8 which is slidably connected to and moved forward or backward by a cylinder 9 which may be operated by hydraulic pressure. The cam slide moves horizontally forward or backward between a lower-plate retainer 10 and a punch-pin carrier bar 12 which is provided with openings to receive a guide pin 11 for the carrier bar 12 and a punch pin 13 which is moved up and down in accordance with the relative movement of the cam slide and within the gate section 5.

Figure 4:
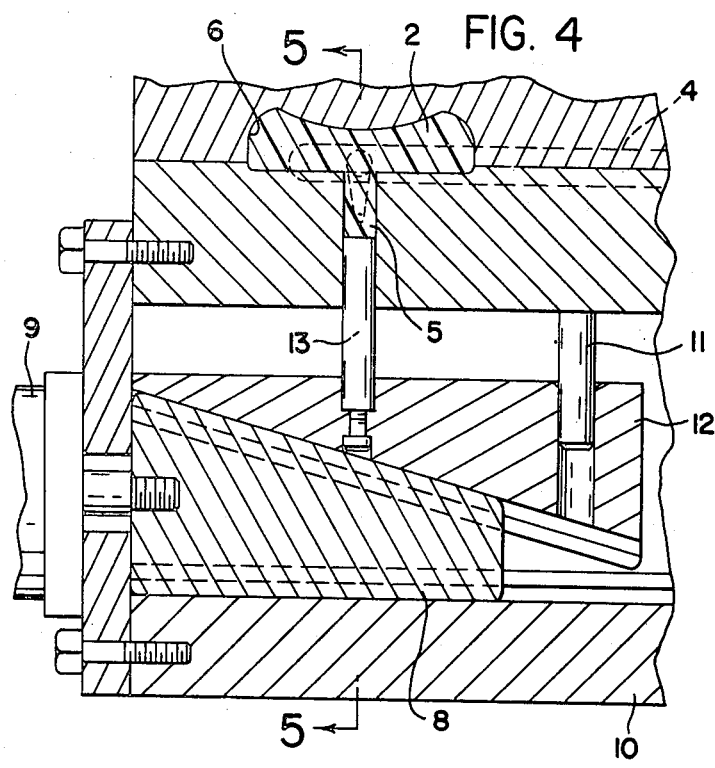
FIG. 4 is a view taken along line 4—4 in FIG. 2.
Figure 5:
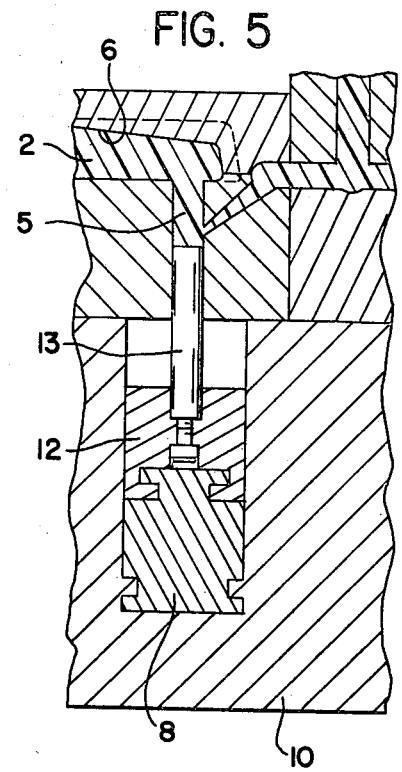
FIG. 5 is a view taken along line 5—5 in FIG. 4.
Figure 6:
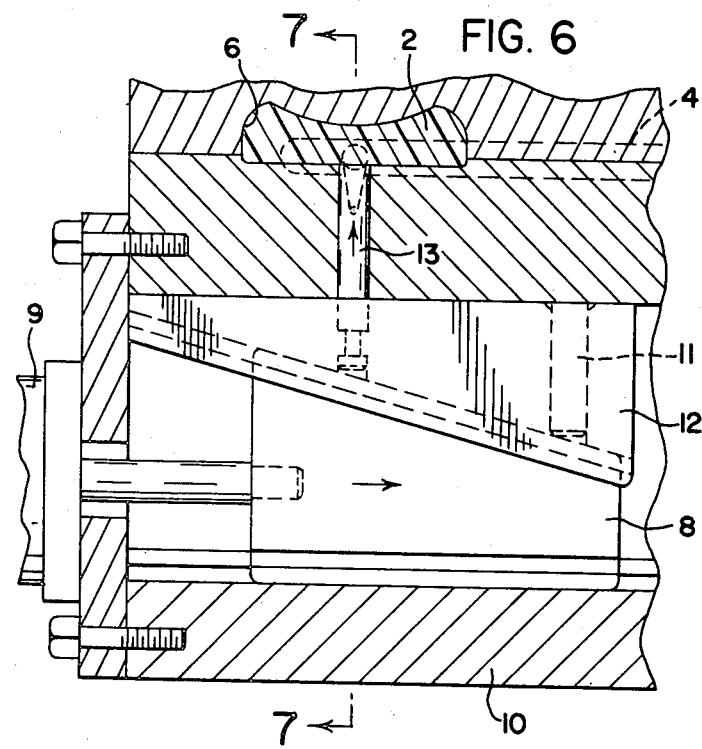
FIG. 6 is a view like that of FIG. 4 showing parts of the apparatus in different positions.
Figure 7:
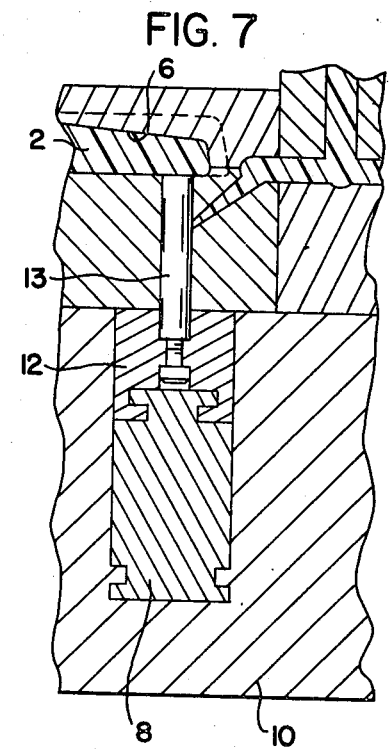
FIG. 7 is a view taken along line 7—7 in FIG. 6.

When the mold cavity 6 is completely filled and while the plastic is still in a semi-fluid state, the hydraulic cylinder 9 advances the cam slide 8 from the position shown in FIGS. 4 and 5 to the position shown in FIGS. 6 and 7, whereby the punch pin 13 moves upwardly pushing the plastic which normally would be the stud 7 completely into the mold cavity 6. The punch-pin carrier bar 12 is retained from moving in a direction parallel to the movement of the cam slide 8 travel by means of a guide pin 11 and is caused by the angle of the cam slide 8 to move in a direction perpendicular to the mold cavity 6 thereby advancing the punch pin 13 and pushing the excess plastic in the gate section 5 into the mold cavity 6. Because the plastic material at this stage is still soft and flowable and the volume of the gate section 5 above the punch pin 13 is small, it becomes a homogeneous part of the final finished molded brush back which is ejected from the mold having the appearance shown in FIG. 8.

When the hydraulic cylinder piston is retracted as shown in FIGS. 4 and 5, the punch-pin carrier bar 12 and punch pin 13 return to their original position, and another shot of plastic material can be run into the mold cavity 6.

This invention eliminates the previously required operation of machining of the gate stud 7 from the brush back 2. This invention thus reduces cost, provides a means for automating the molding operation, and produces a finished brush back from the mold having substantially no visible gate mark or imperfection.

We claim:

1. The process of making a finished brush back, comprising: injecting a plastified thermoplastic material into a cavity of a mold through a tunnel gate communicating with said cavity, moving a punch pin into said gate until an end of said pin is flush with an inner surface of a wall of said mold defining said cavity, to force thermoplastic material from said gate into said cavity, accomplishing said moving by moving horizontally one wedge of a pair of cooperating wedges to actuate a second wedge of said pair causing it to move transversely to the direction of movement of said first wedge, said second wedge actuating said pin, while preventing movement of said second wedge, in a direction parallel to the direction of movement of said first wedge, by movably receiving a guide pin in an aperture therein.

2. The process of claim 1 wherein the punch-pin movement is provided by a cam slide.

3. The process of claim 2 wherein the cam slide is operated by means of a hydraulic cylinder.

* * * * *